US006945832B2

(12) United States Patent
Roycroft

(10) Patent No.: US 6,945,832 B2
(45) Date of Patent: Sep. 20, 2005

(54) SUSPENSION ARRANGEMENT

(75) Inventor: Terence James Roycroft, Waiuku (NZ)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/432,122

(22) PCT Filed: Nov. 30, 2001

(86) PCT No.: PCT/GB01/05320
§ 371 (c)(1),
(2), (4) Date: Oct. 6, 2003

(87) PCT Pub. No.: WO02/44006
PCT Pub. Date: Jun. 6, 2002

(65) Prior Publication Data
US 2004/0072479 A1 Apr. 15, 2004

(30) Foreign Application Priority Data
Dec. 1, 2000 (GB) .............................. 0029298

(51) Int. Cl.$^7$ ............................................ B63B 35/00
(52) U.S. Cl. ................. 440/12.52; 440/12.66
(58) Field of Search ................. 440/12.66, 12.67, 440/12.68, 12.69, 12.7, 12.5, 12.51, 12.52, 12.53, 12.54; 114/344; 280/124.157, 124.158, 124.159, 124.16, 124.161, 124.162, 124.163

(56) References Cited

U.S. PATENT DOCUMENTS 2,728,583 A * 12/1955 Tucker ................. 280/43.18
4,397,473 A * 8/1983 Miles et al. ................. 280/64
4,658,751 A * 4/1987 Koot ................. 440/12.63
4,958,584 A 9/1990 Williamson ................. 114/270
5,531,179 A 7/1996 Roycroft et al. ............ 114/270
5,755,173 A 5/1998 Rorabaugh et al. ......... 114/270
5,769,021 A 6/1998 Schad ................. 114/270

FOREIGN PATENT DOCUMENTS

| EP | 0 026 131 | | 9/1980 |
| FR | 2 731 656 | | 3/1995 |
| GB | 2 400 082 | * | 6/2004 |
| WO | WO 95/23074 | | 8/1995 |

OTHER PUBLICATIONS

International Search Report dated May 3, 2002.
United Kingdom Search Report dated Feb. 9, 2001.

* cited by examiner

Primary Examiner—Sherman Basinger
(74) Attorney, Agent, or Firm—Young & Basile, P.C.

(57) ABSTRACT

Vehicle suspension having a control arm pivotally mounted to vehicle body. Wheel support is pivotally mounted to the control arm. A hydraulic strut is pivotally mounted to body at trunnion mount. The wheel may be protracted to be placed vertically on the road surface or retracted at an angle, for example to allow good marine performance in an amphibious vehicle. Strut may be extended or retracted by hydraulic fluid pumped through ports and may also be used for wheel springing and damping. As trunnion mount is part way up the strut, the strut can pivot out of the way of the retracing wheel. A second control arm may also be fitted; this may be part of a double wishbone wheel suspension.

12 Claims, 3 Drawing Sheets

SUSPENSION ARRANGEMENT

BACKGROUND OF THE INVENTION

The present invention relates to a suspension arrangement for a vehicle, and more particularly, but not exclusively to a suspension arrangement for an amphibious vehicle.

In conventional suspension arrangements a shock absorber or suspension strut is mounted at its upper end to a vehicle body, and at its lower end to a control arm of a vehicle wheel. The suspension strut usually consists of a cylinder and a shaft which telescopes within the cylinder, the cylinder and shaft being internally biased apart and damped. The cylinder is mounted on the control arm, and usually carries a seat for a coil spring. The coil spring is compressed between the seat and the vehicle body.

In more sophisticated vehicle suspension arrangements, it is known to mount a hydraulic cylinder at its upper end to a vehicle body and at its lower end to a control arm of a vehicle wheel. The cylinder is usually connected to an accumulator in the form of a reservoir of hydraulic oil, which is pressurised by compressed gas. The compressed gas provides resilience in the hydraulic system, and damping is provided by restrictions in the hydraulic lines.

It is often a requirement of an amphibious vehicle that the wheels of the vehicle can be retracted upwards and inboard of the vehicle body presenting a smooth hull surface for good marine performance. Conventional suspension arrangements do not allow for sufficient movement of a suspension strut or hydraulic cylinder without it interfering with the vehicle wheel being retracted.

Prior art retractable suspensions for amphibious vehicles include U.S. Pat. No. 5,690,046 (Grzech). This vehicle is an amphibious three-wheeled motorcycle, using hydraulic rams to withdraw coil spring and damper units on front and back wheels. The main drawback of this approach is that there is negligible camber change as the suspension operates, nor as the wheel is withdrawn. With the relatively small wheels disclosed, this is not a problem, because the wheels can be stored vertically within the vehicle bodywork. However, such small wheels limit both on-road ground clearance, and the deadrise (the depth of the "vee" in lateral cross-section) on an amphibious vehicle hull. This in turn limits marine speed and handling potential. It should also be noted that the vehicle would have to bank into turns on the road, and to use motorcycle tyres, to obtain adequate roadholding without wheel camber change on corners. This is therefore not a suitable solution for a car-sized amphibian.

WO 95/23074 (Roycroft) discloses rotating torsion bars which lift road wheels. This is an elegant solution, but takes up a lot of space away from the wheels, in the centre of the vehicle. Similarly, U.S. Pat. No. 5,755,173 (Rorabaugh and Costa) discloses a system using lateral screw jacks, which pass across the centre of the vehicle adjacent to front and rear axles; which could again cause packaging problems. It is generally accepted in automotive engineering that it is advantageous to contain wheel suspensions entirely within the respective wheel arches; which is one reason why both torsion bar and leaf spring suspensions have fallen out of favour.

It is therefore an object of the invention to provide an improved suspension arrangement, which provides for increased upward and inboard movement of a vehicle wheel being retracted.

SUMMARY OF THE INVENTION

According to a first aspect of the present invention, there is provided a suspension arrangement for an amphibious vehicle comprising a control arm pivotally mounted to the vehicle body and extending to a wheel support, the control arm and the wheel support being mounted for pivotal movement one relative to the other, and the wheel support including means for supporting a vehicle wheel, the suspension arrangement further comprising drive means pivotally mounted to the vehicle body in spaced relationship to the mounting for the control arm and operative to rotate the control arm about its pivotal connection to the body to displace the wheel support, and hence the vehicle wheel, for movement between a pair of limiting positions, in the first of which the wheel lies generally vertically for road engagement and in the second of which the wheel lies in a retracted position for use of the vehicle on water, characterised in that the drive means is pivotally mounted to the vehicle body at a position intermediate its length, such that, in use, the drive means pivots relative to the vehicle body as the wheel support moves between the first and second limiting positions.

Preferably, the drive means is elongate and varies in length to move the wheel support between the first and second limiting positions, the drive means being pivotally mounted to the vehicle body about an axis which lies in a region comprising approximately a central third portion of the length of the drive means when the wheel support is at its first limiting position.

Preferably, the suspension arrangement is adapted such that the drive means can pivot through an angle 20° or more as the wheel support moves between the first and second limiting positions. More preferably, the suspension arrangement is adapted such that the drive means can pivot through an angle of approximately 35° as the wheel support moves between the first and second limiting positions.

Preferably, the drive means is pivotally mounted to the vehicle body by means of at least one trunnion.

The drive means may comprise a dual acting hydraulic cylinder or ram, in which case, the ram may comprise a shaft operatively connected to the control arm at one end and to a piston contained within a cylinder at the other end, the cylinder being pivotably mounted to the vehicle body. In this arrangement, it is preferred that the hydraulic ram provides suspension for the wheel when the wheel support is in the first limiting position.

Preferably, the control arm is a first control arm, and the wheel support is also pivotally attached to the vehicle body by means of a second control arm mounted above the first control arm. More preferably, both the first and second control arms are connected to the wheel support by means of ball joints which allow the control arms and the wheel support to move together in a parallelogram like manner. In a particularly preferred embodiment, the first and second control arms comprise a double wishbone arrangement.

In accordance with a second aspect of the invention, there is provided an amphibious vehicle comprising a suspension arrangement in accordance with the first aspect.

BRIEF DESCRIPTION OF THE DRAWINGS

The invention will now be described, by way of example only, with reference to the accompanying drawings in which.

DETAILED DESCRIPTION OF THE PREFERRED EMBODIMENTS

Figure 1:
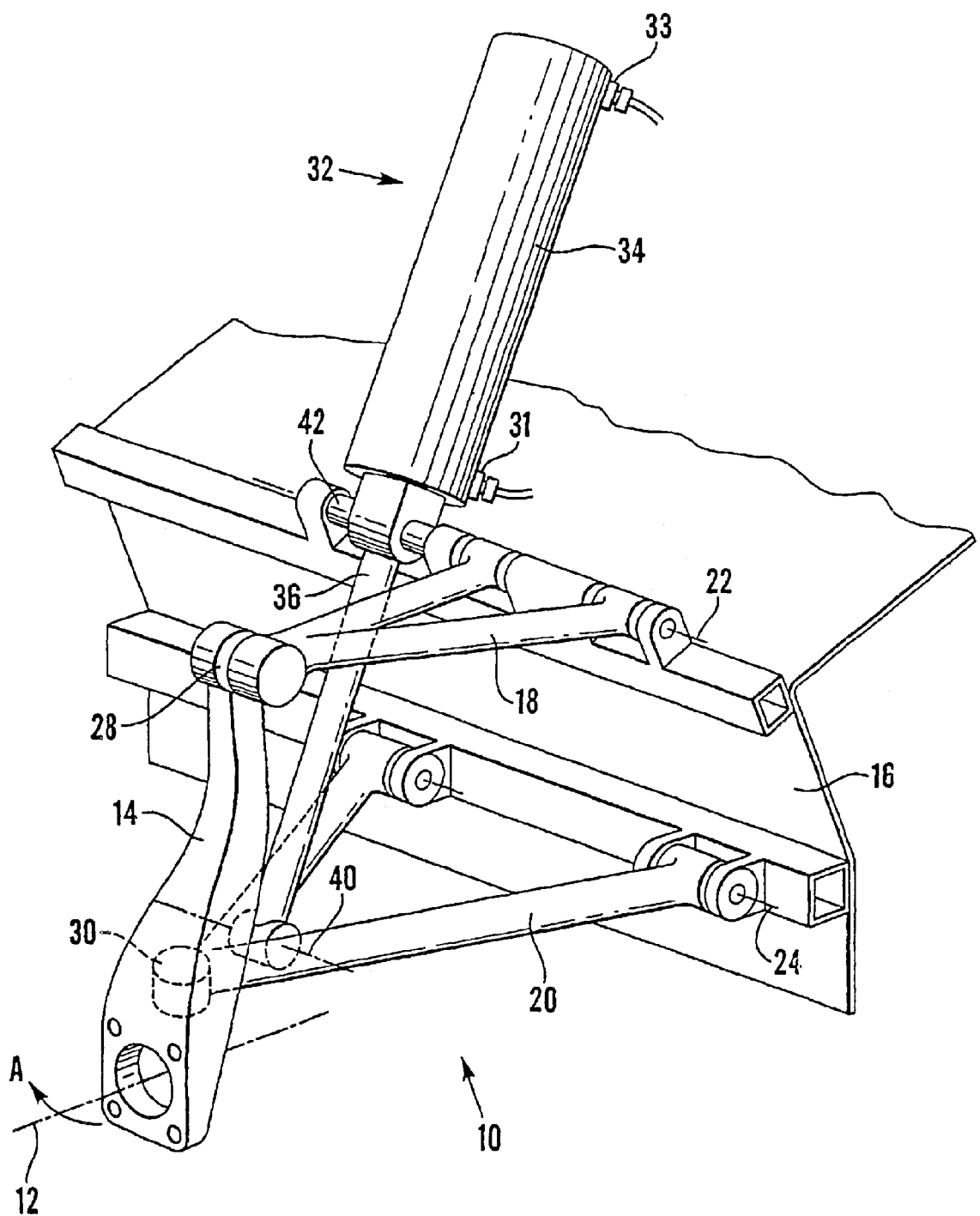
FIG. 1 is a perspective view of a suspension arrangement in accordance with the invention.
Figure 2:
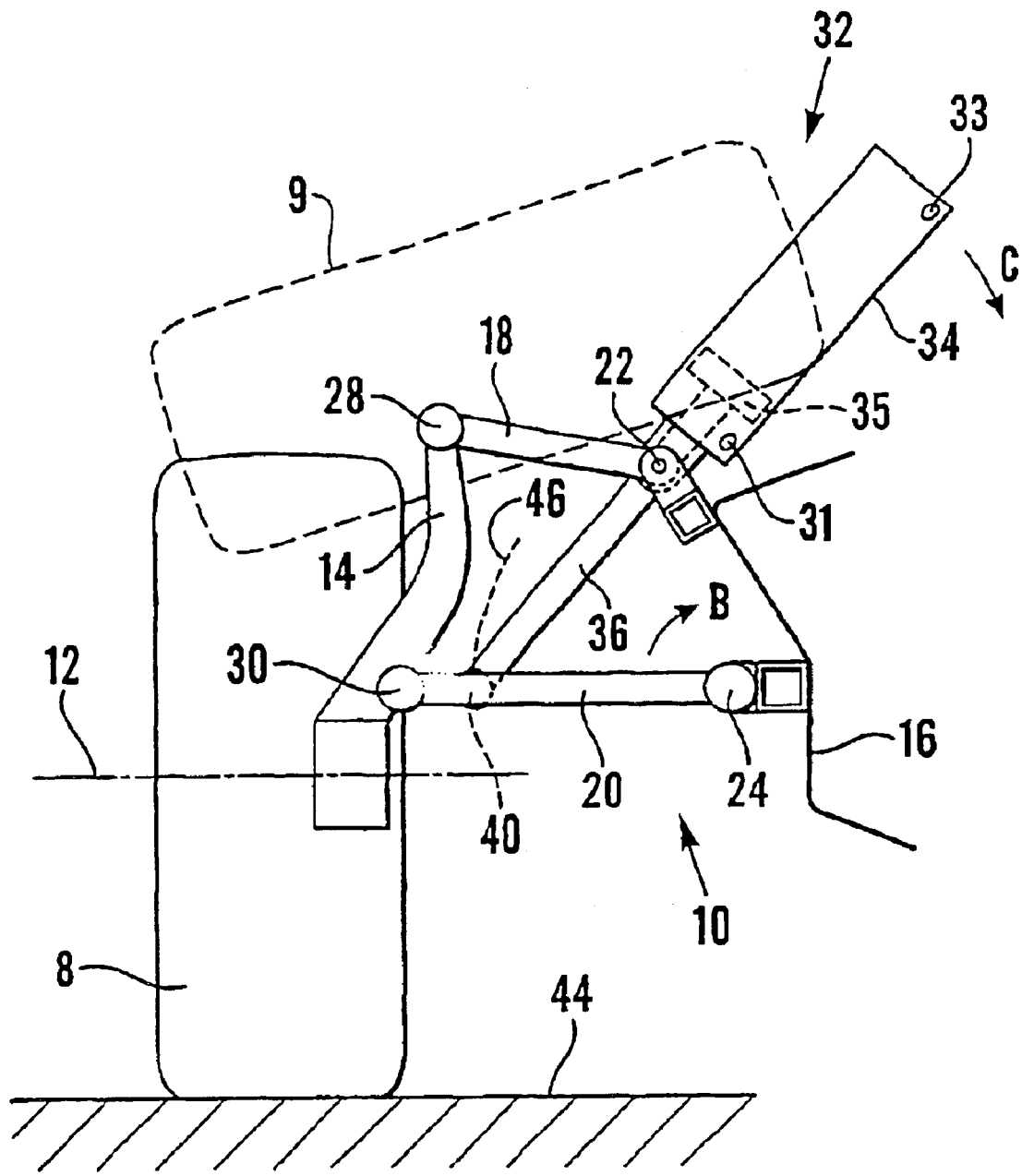
FIG. 2 is a schematic end view of the suspension arrangement of FIG. 1, showing in the wheel and suspension in a protracted position for road use.

Referring firstly to FIGS. 1 and 2, a suspension arrangement for an amphibious vehicle wheel 8 is indicated generally at 10. The wheel 8 is mounted for rotation about an axis 12 on an axle (not shown), which is conventionally mounted to a wheel support upright 14. An upper control arm 18 and a lower control arm 20 support the wheel support upright 14 from the vehicle body 16. The control arms 18,20 are aligned with and spaced from each other and are pivotally mounted to the vehicle body 16 about respective parallel axes 22,24. This is commonly known as a double wishbone suspension arrangement.

Respective ball-joints 28,30 connect the control arms 18,20 to the wheel support upright 14. The ball joints allow turning movement of the wheel support upright 14, and-hence the wheel 8, in a lateral plane enabling steering in driving mode, as indicated by arrow A. The ball joints 28,30 also allow the control arms 18,20 to move together in parallelogram like manner during normal road suspension operation. As in conventional double wishbone structures, the steering system (not shown) of the vehicle is connected to the wheel support upright 14. In the case of the rear wheels of the vehicle, which are not steered, the wheel support upright 14 is held in a fixed position by a track control rod (not shown) which is attached to the vehicle body in known manner.

The suspension arrangement 10 further comprises a suspension strut or drive means 32 in the form of a hydraulic cylinder 34 with a dual acting piston (35, FIGS. 2 and 3) and shaft 36, the shaft being capable of telescoping movement in and out of the cylinder 34. Ports 31, 33 are provided at respective ends of the cylinder 34, which are connected to hydraulic lines for supplying pressurised hydraulic oil to the cylinder for providing suspension and extension or retraction of the shaft 36. A pivotal mount 42 in the form of a trunnion mounts the lower end of the cylinder 34, through which the shaft 36 actuates, to the vehicle body 16. The upper end of the cylinder 34 is not attached to the vehicle body 16, allowing the cylinder to pivot unimpeded about the mounting 42. The end of the shaft 36, which is extended from the cylinder 34, is pivotally connected at 39 to the control arm 20 about an axis 40, in a position proximate the end of the control arm adjacent the wheel 8.

Referring now in particular to FIG. 2, the suspension arrangement 10 is shown in road mode, with the wheel 8 in contact with a road surface 44 in a generally vertical position. The shaft 36 of the suspension strut 32 is almost fully extended, further extension of the shaft 36 enabling the wheel 8 to accommodate depressions in the road surface 44. If the wheel 8 was moved to a retracted position, shown in dotted outline 9, it can be seen that the wheel 8 would foul the cylinder 34, if the cylinder was not moved.

When the vehicle enters water and it is necessary to retract the vehicle wheel 8 upwards and inboard of the vehicle body 16 for boat mode, pressurised hydraulic oil is supplied to the cylinders lower port 31. Consequently, the piston 35 of the cylinder 34 acts to retract the shaft 36 into the cylinder. As the shaft 36 retracts, the control arm 20 rotates about the axis 24 in the direction shown by arrow B, and the pivotal connection of the shaft 36 to the control arm, having axis 40, follows an arc as indicated by the dotted line 46. The locus of the connection 39 between the control arm 20 and shaft 36, and the requirement that the shaft 36 and cylinder remain in axial alignment causes the cylinder 34 to rotate about the pivotal mount 42 as indicated by arrow C in response to the movement of the control arm 20. Thus, axial alignment of the shaft 36 and cylinder 34 are maintained during the retraction.

Figure 3:
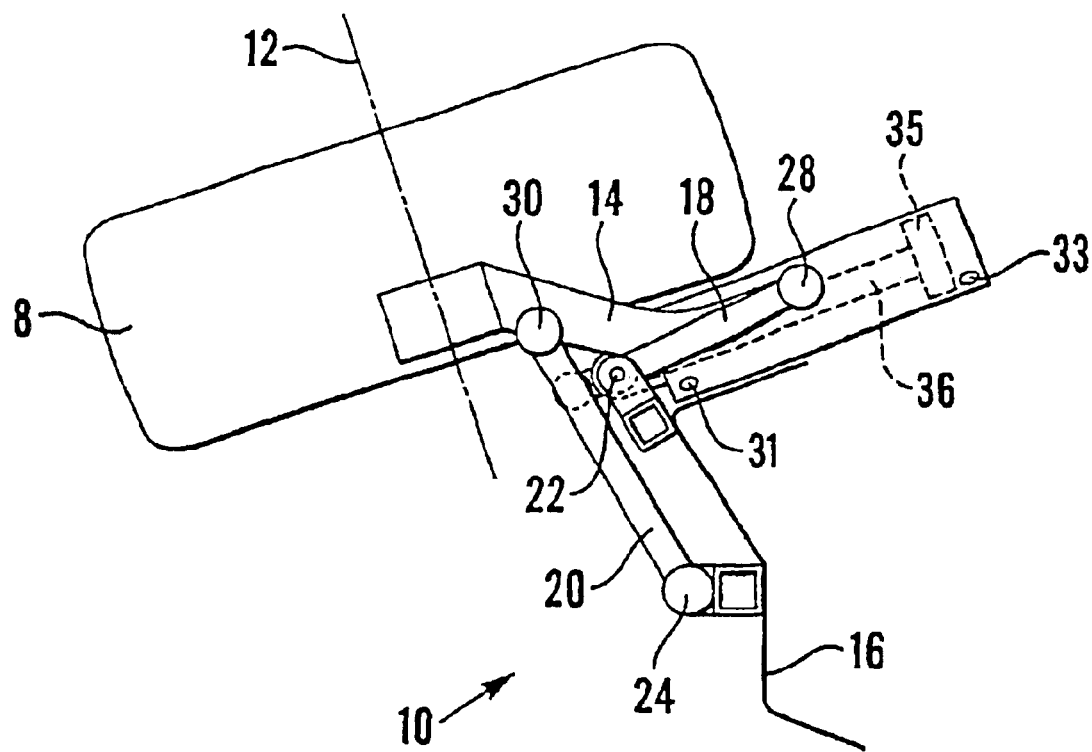
FIG. 3 is a view similar to that of FIG. 2 but showing the suspension and wheel in a retracted position for use in a marine mode.

When the shaft 36 is fully retracted into the cylinder 34 as shown in FIG. 3, the control arm 20 and wheel 8 have moved upwards through an angle of approximately 60° towards the vehicle body 16, and the hydraulic cylinder 34 has pivoted about the mount 42 through an angle of approximately 35° to a position almost parallel with that of the raised wheel 8. This angular movement of the cylinder 34 moves the cylinder out of the path of the wheel 8 as the wheel is raised, and enables a major portion of the wheel to be moved inboard of the vehicle body.

In order to lower the wheel from the retracted position to the vertical position for road mode, pressurised hydraulic oil is supplied to the upper port 33 of the cylinder 34. Consequently, the piston 35 moves downwardly in the cylinder such that the shaft 36 extends causing the control arm 20, the wheel 8 and the cylinder 34 to move back to their road mode positions, following the same path of movement as for retraction, but in the opposite direction.

It can be seen from FIG. 2, that the axis 22 about which the drive means 32 is pivotally mounted to the vehicle body 16 lies about mid-way along the length of the drive means when the wheel is in the protracted position. Preferably, the axis 22 is arranged to lie some where in a region which comprises a central third of the length of the drive means when the wheel is in the protracted position.

In the suspension arrangement 10 described above, the drive means 32 for moving the suspension and wheel assemblies between protracted and retracted positions is provided in the form of a double acting hydraulic cylinder or ram. This need not be the case, however, and any suitable form of drive means can be used. For example, the drive means 32 may be in the form of a pneumatic cylinder and piston, or any other suitable mechanical means driven hydraulically, pneumatically or electrically.

What is claimed is:

1. A suspension arrangement for an amphibious vehicle comprising a control arm pivotally mounted to the vehicle body and extending to a wheel support, the control arm and the wheel support being mounted for pivotal movement one relative to the other, and the wheel support including means for supporting a vehicle wheel;

the suspension arrangement further comprising drive means pivotally mounted to the vehicle body in spaced relationship to the mounting for the control arm and operative to rotate the control arm about its pivotal connection to the body to displace the wheel support, and hence the vehicle wheel, for movement between a pair of limiting positions, in the first of which the wheel lies generally vertically for road engagement and in the second of which the wheel lies in a retracted position for use of the vehicle on water;

wherein the drive means is pivotally mounted to the vehicle body at a position intermediate its length, such that, in use, the drive means pivots relative to the vehicle body as the wheel support moves between the first and second limiting positions;

and when the wheel is in a retracted position said wheel lies at an angle to the vertical and overlaps the drive means in both longitudinal and transverse directions of the vehicle.

2. A suspension arrangement as claimed in claim 1, in which the drive means is elongate and varies in length to move the wheel support between the first and second limiting positions, the drive means being pivotally mounted to the vehicle body about an axis which lies in a region comprising approximately a central third of the length of the drive means when the wheel support is at its first limiting position.

3. A suspension arrangement as claimed in claim 1 adapted such that the drive means can pivot through an angle 20° or more as the wheel support moves between the first and second limiting positions.

4. A suspension arrangement as claimed in claim 3, adapted such that the drive means can pivot through an angle of approximately 35° as the wheel support moves between the first and second limiting positions.

5. A suspension arrangement as claimed in claim 1, in which the drive means is pivotally mounted to the vehicle body by means of at least one trunnion.

6. A suspension arrangement as claimed in claim 5, in which the ram comprises a shaft operatively connected to the control arm at one end and to a piston contained within a cylinder at the other end, the cylinder being pivotably mounted to the vehicle body.

7. A suspension arrangement as claimed in claim 1, in which the drive means comprises a dual acting hydraulic cylinder or ram.

8. A suspension arrangement as claimed in claim 7, in which the hydraulic ram provides suspension for the wheel when the wheel support is in the first limiting position.

9. A suspension arrangement as claimed in claim 1, in which the control arm is a first control arm, and the wheel support is pivotally attached to the vehicle body by means of a second control arm mounted above the first control arm.

10. A suspension arrangement as claimed in claim 9, in which both the first and second control arms are connected to the wheel support by means of ball joints which allow the control arms and the wheel support to move together in a parallelogram like manner.

11. A suspension arrangement as claimed in claim 9, in which the first and second control arms comprise a double wishbone arrangement.

12. An amphibious vehicle comprising a suspension arrangement as claimed in claim 1.

* * * * *